April 29, 1969   D. E. SUTTON   3,440,933
ADJUSTABLE STROKE CONTROL DEVICE
Filed Dec. 2, 1966

INVENTOR
DONALD E. SUTTON
BY
Woodhams, Blanchard & Flynn
ATTORNEYS

INVENTOR
DONALD E. SUTTON

BY
Woodhams, Blanchard & Flynn
ATTORNEYS

United States Patent Office 3,440,933
Patented Apr. 29, 1969

3,440,933
ADJUSTABLE STROKE CONTROL DEVICE
Donald E. Sutton, Comstock Township, Kalamazoo County, Mich., assignor to Hammond Machinery Builders, Inc., Kalamazoo, Mich., a corporation of Michigan
Filed Dec. 2, 1966, Ser. No. 598,765
Int. Cl. F01b 9/02, 29/00; F01l 25/02
U.S. Cl. 92—13                    5 Claims

ABSTRACT OF THE DISCLOSURE

An adjustable stroke control device for controlling the stroke applicable to a drive member of an oscillatable or reciprocating mechanism. Power means having a reciprocable driving member is pivotably connected to the drive member to define an angular relationship therebetween. The power means is supported for rotational movement relative to a frame between first and second positions to change the angular relationship. Adjustable control means are provided for rotatably moving the power means to selectable positions between and including said first and second positions for controlling the stroke applied to the drive member.

---

This invention relates to a mechanism for use with a machine or other apparatus which is driven by a reciprocating means and more particularly to a device for adjustably controlling the stroke of a reciprocating device operated by a pressure fluid. This application is related to my application entitled, "Face Mill Grinder," Ser. No. 598,806, filed concurrently herewith.

Although reciprocating devices operated by pressure fluid have long been used extensively, there has, until now, existed a problem of how in a simple manner to adjustably control the magnitude of the stroke. Various attempts have been made to provide such a control device which may be infinitely adjusted in accord with the different requirements of use but such devices have not yet proven completely satisfactory. For example, one such arrangement included a V-belt and variable pulley system disposed between a hydraulic power source and the machine being operated. Although this did provide a degree of control, certain problems were inherent, for example, the recurrent necessity of replacing the V-belt and the ever present possibility of breaking the V-belt at an inopportune time. Other attempts to provide such a means for adjustment have resulted in equally serious disadvantages, such as in a device which requires partial disassembling of the machine to reposition the hydraulic cylinder, thus providing such control but a control which is limited to semipermanent positioning. Further, such devices were also usually limited to a certain number of degrees or steps of adjustment.

Accordingly, the objects of the invention include:

(1) To provide a means of adjustment for pressure fluid operated machines of such design as to be simple and economical to make and yet be reliable in operation.

(2) To provide a means of adjustment, as aforesaid, which can effect adjustment during operation of the machine with which it is associated.

(3) To provide a means of adjustment, as aforesaid, which has an infinite number of adjustments rather than a imited number of steps of adjustment.

(4) To provide a means of adjustment, as aforesaid, which is adjustable from a stroke of zero, or nearly zero, amplitude to a stroke of maximum amplitude.

(5) To provide a means of adjustment, as aforesaid, which as compared to other methods is sufficiently simple to adjust that a highly trained technician is not required for adjusting said machine.

(6) To provide a means of adjustment, as aforesaid, which can be operated by the simple turning of a dial.

(7) To provide a means for adjustment, as aforesaid, which, once adjustment has been made, same will be retained and will not creep.

(8) To provide a means for adjustment, as aforesaid, which will be durable.

(9) To provide a means for adjustment, as aforesaid, which will be direct.

(10) To provide a means for holding the reciprocated object rigid when the device is turned off so that other clamping is not required.

Other objects and purposes of the invention will be apparent to persons acquainted with the device of this general type upon reading of the following specification and examination of the following drawings.

General description

The objects and purposes of the invention, including those set forth above, have been met by provision of a linearly reciprocating power unit which may be powered by a pressure fluid and which is capable of imparting motion to a machine, such as the angularly oscillating head of an electrolytic grinding machine. The reciprocating power unit is in this embodiment mounted on a shaft so that by rotating the shaft, the linear direction of reciprocation of the power unit may be varied as compared to the direction of oscillation of the machine being driven, whereby the useful component of the motion of the driving unit may be infinitely varied. A worm gear combination which is associated with a dial may be used to effect the adjustment.

Although the present description is given in terms of a hydraulically operated oscillating unit of an electrolytic grinder, it should be realized that the broader scope of the invention would also include other types of reciprocating power units used on any of a number of machines having reciprocating or oscillating components.

For purpose of convenience in description, the terms "upper," "lower" and words of similar import will have reference to the device as illustrated in the figure referred to and terms "inner," "outer" and derivatives thereof will have reference to the geometric center of the adjustable stroke control device and parts thereof.

Detailed description

Figure 1:
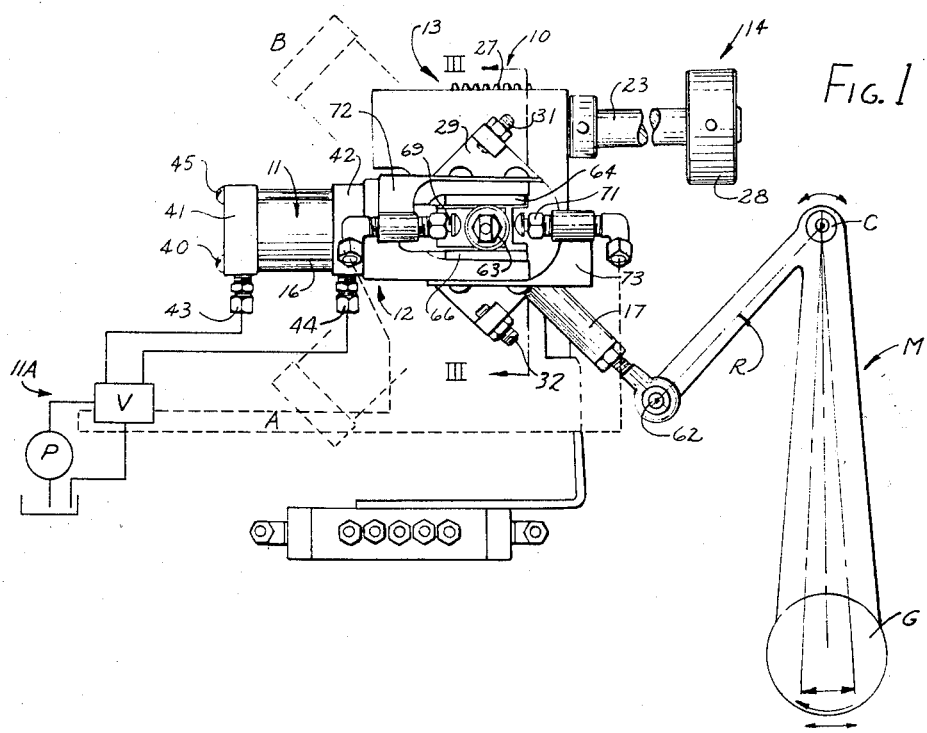
FIGURE 1 is a broken, front view of an adjustable stroke control device indicating in dotted lines an adjustment from a maximum to a minimum.
Figure 2:
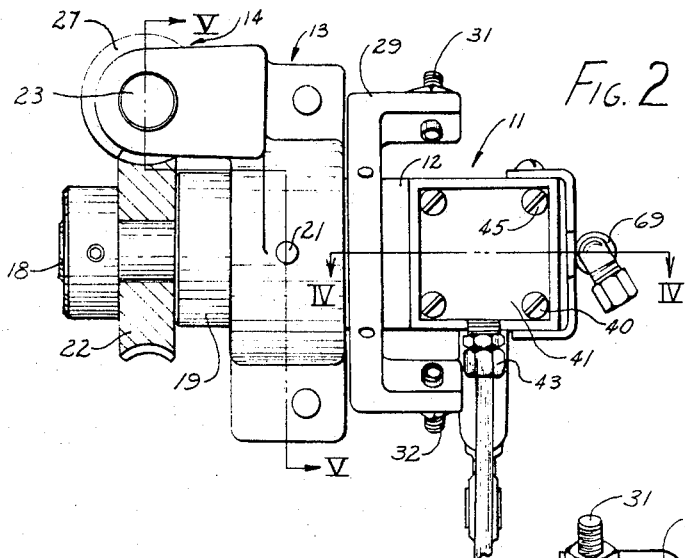
FIGURE 2 is an end view of the adjustable stroke control device partially in cross section.

The adjustable stroke control device 10, of which FIGURES 1 and 2 illustrate a preferred embodiment, is comprised of a reciprocating power unit 11 said unit being secured to a mounting frame 12 which is rotatably adjustable in relation to base structure 13 by an adjustable control means 14.

A fluid circuit 11A is provided for reciprocating the output member of the power unit 11. Since the fluid circuit is of a conventional construction, further discussion thereof is deemed unnecessary.

Generally the reciprocating power unit 11 will be operated by any suitable pressure fluid and will have a pressure cylinder 16 which operates a coupling means in the form of a pitman 17. Said pitman may, as in the preferred embodiment, operate the angularly oscillating drive member M of a device having an oscillating grinding wheel G illustrated further in my aforesaid application entitled "Face Mill Grinder" (filed concurrently herewith) having an axis C on which same may angularly oscillate. The size of the reciprocating power unit 11 of course may vary in accord with the requirements of the machine that is being operated.

Figure 5:
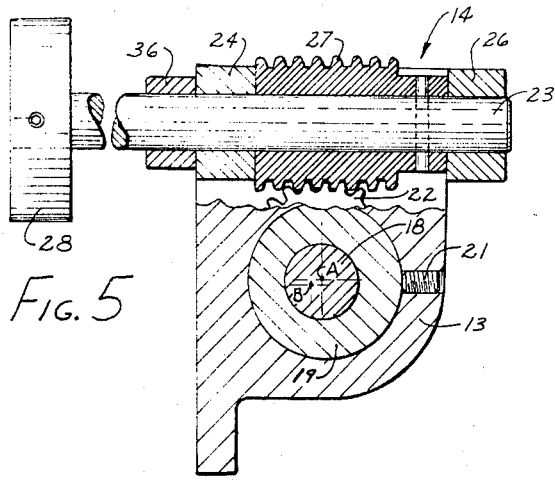
FIGURE 5 is a cross-sectional view taken along the line V—V in FIGURE 2 and illustrates the position of the worm and gear.

Pressure cylinder 16 is secured to mounting frame 12 by conventional means (not shown), said frame having a shaft 18 (FIGURE 3), extending rearwardly therefrom, which is mounted for rotatable movement around a horizontal axis, such as in bearing 19 (FIGURE 5) which is fixed with respect to base structure 13, as by set screw 21.

Figure 4:
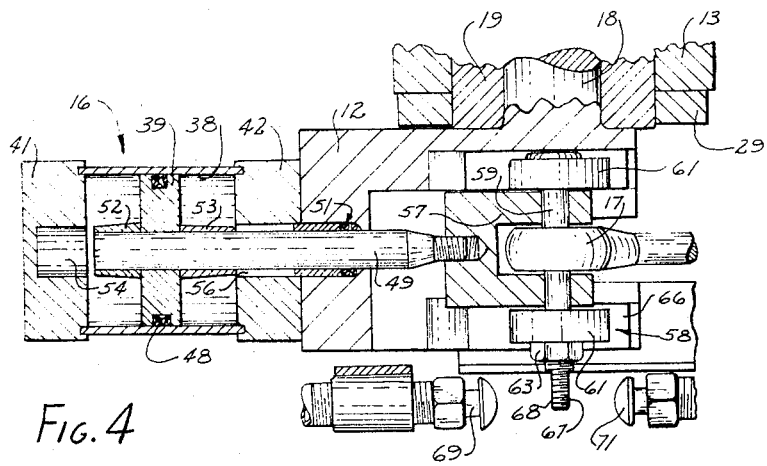
FIGURE 4 is a cross section of the pressure cylinder taken along the line IV—IV in FIGURE 2.

The pressure cylinder 16 (FIGURE 4) has a hollow cylindrical portion 38 through which a piston 39 may slide. A pair of cylinder heads 41 and 42 are in sealed engagement with said portion 38, one at each end thereof, and are secured to each other in a conventional manner by screws 40 and 45 (FIGURE 1). A pair of nipples 43 and 44 are attached to cylinder heads 41 and 42, respectively, thus providing connections into cylindrical portion 38. Disposed within cylinder 16 (FIGURE 4) is the piston 39 having the usual seal 48 and attached to a reciprocating driving member or piston rod 49 which extends through cylinder head 42 and mounting frame 12. An annular seal 51 is provided in cylinder head 42 to prevent escape of pressure fluid. Extending from each face of the piston 39 is a tapered projection 52 and 53. Cylinder heads 41 and 42 contain corresponding cavities 54 and 56, said cavities having parallel walls. As said piston 39 approaches the leftward extremity (FIGURE 4) of its stroke and projection 52 extends into cavity 54 in cylinder head 41, the exit of pressure fluid therefrom becomes progressively less and greater resistance to said entry is effected by the fluid. After piston 39 reverses and as same approaches the rightward extremity (FIGURE 4) of its stroke, a repetition of the above-outlined process takes place with projection 53 and cavity 56. This arrangement provides a means of controlling the travel of the piston so as to slow it at the ends of its stroke and move it faster during the midportion.

Figure 3:
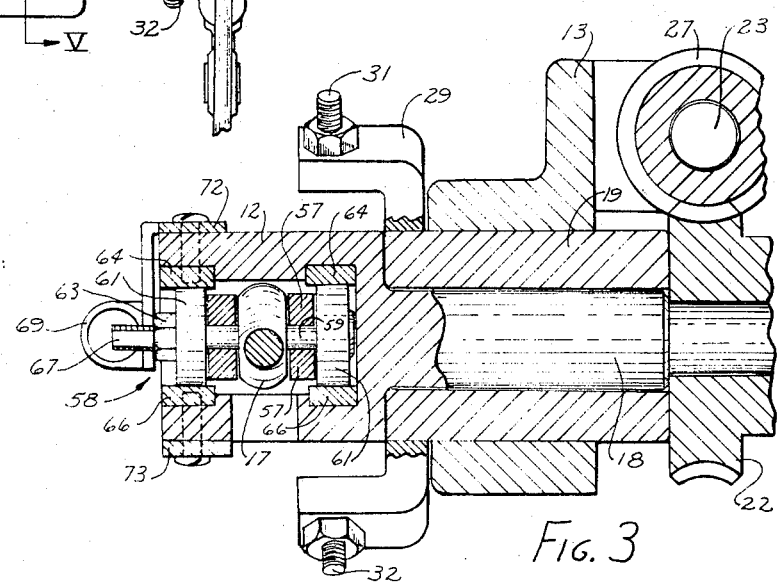
FIGURE 3 is a cross-sectional view taken along the line III—III in FIGURE 1.

Attached to the right end of piston rod 49 is a clevis 57 which cooperates with a slider 58 (FIGURE 3). Said slider has a clevis pin 59 which extends through clevis 57 and guide rollers 61. The leftward end (FIGURE 1) of pitman 17 is pivotally attached to pin 59, whereas the opposite end of same is pivotally attached at 62 in a convenient manner to the work load (FIGURE 1) here oscillating drive member M. Clevis pin 59 may be held securely in place by nut 63. The guide rollers 61 may be disposed between pairs of wear strips, upper wear strips 64 and lower wear strips 66, held by suitable screws in the frame 12. Pin 59 has a pair of flat portions 67 and 68 which contact either poppet bleeder valve 69 or 71 (FIGURE 4), respectively, to cause reciprocation as hereinafter described. Popper valve 69 may be attached to mounting frame 12 by conventional means such as by L-shaped bracket 72 (FIGURE 3), likewise poppet valve 71 is attached to mounting frame 12, such as by L-shaped valve bracket 73.

On the rear end of shaft 18 is mounted worm gear 22, which gear is connected to the adjustable control means 14. Control means 14 is comprised of a shaft 23 which is rotatably mounted in bearings 24 and 26 which are fixed with respect to frame structure 13. A worm 27 is securely mounted near the end of shaft 23 adjacent to worm gear 22 and drivingly engaged with said worm gear, while a knob 28 (FIGURE 5) is attached to the opposite end of said shaft. Mounting frame 12 is adjustably rotatable by turning knob 28 which causes worm 27 to drive worm gear 22 which in turn rotates shaft 18 of mounting frame 12, thus repositioning pressure cylinder 16. Stop collar 29 (FIGURE 2), which may be locked with respect to frame structure 13, may be provided to limit the extremes of adjustment, stop screws 31 and 32 being provided so that the limits of said adjustment may be set in accord with the requirements of the operation.

An adjustment to take up the slack, if any, between worm gear 22 and worm 27 may be provided by use of an eccentric type bearing 19, where (FIGURE 5) point A is the center of the outer circumference of said bearing and point B is the center of the inner circumference of said bearing. As bearing 19 is rotated in a clockwise direction, shaft 18 is caused to rise toward the worm 27 and once said shaft is properly positioned said adjustment may be retained by set screw 21.

*Operation*

Although the operation of the device has been indicated somewhat above, it will be further detailed hereinbelow for purposes of clear understanding.

The pressure cylinder 16 of the preferred embodiment of the present invention operates much as do conventional pressure fluid power units. As pressurized fluid is applied at nipple 43 (FIGURE 1) and flows into cylinder portion 38 (FIGURE 4) forcing piston 39 rightwardly, flat portion 67 (FIGURE 4) of pin 59 contacts poppet bleeder valve 71 which activates a conventional switching means (not shown). Said switching means causes a reversal of the flow of the pressurized fluid, whereby said fluid is applied at the nipple 44 and exits at nipple 43, thus causing piston 39 to reverse and move in a leftward direction.

Even though the stroke of the pressure cylinder 16 itself always remains constant, its effect on the grinding wheel or other oscillatable or reciprocal machine can be varied. If a minimum stroke of the grinding wheel is desired, the knob 28 may be rotated until the cylinder 16 approaches position A in FIGURE 1 where the reciprocal direction of force of the power unit approaches a direction parallel to the pivotal radius R of the machine being operated, which runs from the axis C through the pivot point 62. In this position pitman 17 primarily oscillates angularly about the pivot point 62 and the axis formed by clevis pin 59 and the stroke component effecting oscillation of the drive member M is at a minimum. If a maximum stroke is desired, the knob 28 is adjusted until the cylinder 16 approaches position B in FIGURE 1, where the direction of reciprocation of the power unit approaches an alignment substantially perpendicular to the pivotal radius R of the machine being operated and the stroke component causing reciprocation of the grinding wheel is at a maximum. Once pressure cylinder 16 has been properly positioned by control means 14, the adjustment will be retained by the normal relationship of the worm and worm wheel in the adjustment power train. Of course, any degree of reciprocation of the grinding wheel between the above-mentioned extremes can be obtained by adjusting the knob to the appropriate position.

The embodiments of the invention in which an exclusive property or privilege is claimed are defined as follows:

1. An adjustable stroke control mechanism for a device having an angularly oscillatable drive member, comprising:
   a power unit having a reciprocating driving member movable along a linear path;
   means rotatably mounting the power unit and the reciprocating driving member for angular movement between first and second positions about an axis substantially transverse to the linear path of movement defined by the reciprocating driving member to change the position of the power unit relative to the oscillatable drive member;
   adjustable control means connected to the mounting means for effecting the angular movement of the power unit into a selected position between and including said first and second positions and for holding the power unit in the selected position when the power unit is energized so as to permit movement of the reciprocating driving member; and coupling means pivotably connecting the reciprocating driving member to the oscillatable drive member and capable of accommodating itself to the angular adjustment of the power unit.

2. A stroke control mechanism according to claim 1, wherein the power unit includes a fluid pressure cylinder having a piston reciprocably mounted therein, the piston being fixedly connected to the reciprocating driving member, the fluid pressure cylinder being angularly movable between said first and second positions about an axis transverse to the longitudinal axis of the piston such that reciprocation of the piston when the fluid pressure cylinder is in the first position causes the maximum angular oscillation of the drive member, whereas reciprocation of the piston when the fluid pressure cylinder is in the second position causes substantially no angular oscillation of the drive member.

3. A stroke control mechanism according to claim 1, further including frame means rotatably supporting said power unit, said adjustable control means including a worm gear fixedly interconnected to said power unit for rotation therewith and a worm rotatably supported on the frame and in meshing engagement with said worm gear, whereby a rotational force supplied to said worm will cause rotation of said worm gear and said power unit so as to angularly move same to said selected position, said worm gear and said worm cooperating to lock said power unit in said selected position.

4. A stroke control mechanism according to claim 3, wherein the power unit is mounted for angular adjustment in a plane containing both the path of movement of the reciprocating driving member and the path of movement of the oscillatable drive member, thereby to change the annular relationship of the reciprocating driving member relative to the oscillatable drive member.

5. A stroke control mechanism according to claim 4, wherein the coupling means includes a pitman pivotally connected at one end thereof to the reciprocating driving member and pivotally connected at the other end thereof to the oscillatable drive member.

References Cited

UNITED STATES PATENTS

| | | | |
|---|---|---|---|
| 131,135 | 9/1872 | Thompson | 92—118 |
| 2,328,721 | 9/1943 | Irrgang | 92—161 |
| 2,954,754 | 10/1960 | Flick | 74—99 |
| 2,986,040 | 5/1961 | Light | 92—118 |
| 3,255,861 | 6/1966 | Fritz | 74—99 |
| 3,334,548 | 8/1967 | Van House. | |

PAUL E. MASLOUSKY, *Primary Examiner.*

U.S. Cl. X.R.

74—104; 91—306; 92—140, 161